April 7, 1970 E. P. GOROG 3,505,470

PROCESS AND DEVICE FOR CODING AND DECODING DIGITAL SIGNALS VIA PHASE MODULATION

Filed March 28, 1967 9 Sheets-Sheet 1

INVENTOR
ETIENNE P. GOROG

BY John B. [signature]
ATTORNEY

| B1: $2^0$ Z | $2^1$ Y | $2^2$ X | $\alpha$ | W | U | R | P | M | L | K | H |
|---|---|---|---|---|---|---|---|---|---|---|---|
| | | | Ei (B2) | 1 | 1 | 1 | 1 | 0 | 0 | 0 | 0 |
| 1 | 0 | 0 | 7 | 1 | 1 | 1 | 1 | 0 | 0 | 0 | 0 |
| 0 | 1 | 0 | | 0 | 1 | 1 | 1 | 1 | 0 | 0 | 0 |
| 1 | 1 | 0 | | 0 | 0 | 1 | 1 | 1 | 1 | 0 | 0 |
| 0 | 0 | 1 | | 0 | 0 | 0 | 1 | 1 | 1 | 1 | 0 |
| 1 | 0 | 1 | | 0 | 0 | 0 | 0 | 1 | 1 | 1 | 1 |
| 0 | 1 | 1 | | 1 | 0 | 0 | 0 | 0 | 1 | 1 | 1 |
| 1 | 1 | 1 | | 1 | 1 | 0 | 0 | 0 | 0 | 1 | 1 |
| 0 | 0 | 0 | | 1 | 1 | 1 | 0 | 0 | 0 | 0 | 1 |
| 0 | 1 | 0 | 6 | 1 | 1 | 1 | 1 | 0 | 0 | 0 | 0 |
| 1 | 1 | 0 | | 0 | 1 | 1 | 1 | 1 | 0 | 0 | 0 |
| 0 | 0 | 1 | | 0 | 0 | 1 | 1 | 1 | 1 | 0 | 0 |
| 1 | 0 | 1 | | 0 | 0 | 0 | 1 | 1 | 1 | 1 | 0 |
| 0 | 1 | 1 | | 0 | 0 | 0 | 0 | 1 | 1 | 1 | 1 |
| 1 | 1 | 0 | | 1 | 0 | 0 | 0 | 0 | 1 | 1 | 1 |
| 0 | 0 | 0 | | 1 | 1 | 0 | 0 | 0 | 0 | 1 | 1 |
| 1 | 1 | 0 | 5 | 1 | 1 | 1 | 1 | 0 | 0 | 0 | 0 |
| 0 | 0 | 1 | | 0 | 1 | 1 | 1 | 1 | 0 | 0 | 0 |
| 1 | 0 | 1 | | 0 | 0 | 1 | 1 | 1 | 1 | 0 | 0 |
| 0 | 1 | 1 | | 0 | 0 | 0 | 1 | 1 | 1 | 1 | 0 |
| 1 | 1 | 1 | | 0 | 0 | 0 | 0 | 1 | 1 | 1 | 1 |
| 0 | 0 | 0 | | 1 | 0 | 0 | 0 | 0 | 1 | 1 | 1 |
| 0 | 0 | 1 | 4 | 1 | 1 | 1 | 1 | 0 | 0 | 0 | 0 |
| 1 | 0 | 1 | | 0 | 1 | 1 | 1 | 1 | 0 | 0 | 0 |
| 0 | 1 | 1 | | 0 | 0 | 1 | 1 | 1 | 1 | 0 | 0 |
| 1 | 1 | 1 | | 0 | 0 | 0 | 1 | 1 | 1 | 1 | 0 |
| 0 | 0 | 0 | | 0 | 0 | 0 | 0 | 1 | 1 | 1 | 1 |
| 1 | 0 | 1 | 3 | 1 | 1 | 1 | 1 | 0 | 0 | 0 | 0 |
| 0 | 1 | 1 | | 0 | 1 | 1 | 1 | 1 | 0 | 0 | 0 |
| 1 | 1 | 1 | | 0 | 0 | 1 | 1 | 1 | 1 | 0 | 0 |
| 0 | 0 | 0 | | 0 | 0 | 0 | 1 | 1 | 1 | 1 | 0 |
| 0 | 1 | 1 | 2 | 1 | 1 | 1 | 1 | 0 | 0 | 0 | 0 |
| 1 | 1 | 1 | | 0 | 1 | 1 | 1 | 1 | 0 | 0 | 0 |
| 0 | 0 | 0 | | 0 | 0 | 1 | 1 | 1 | 1 | 0 | 0 |
| 1 | 1 | 1 | 1 | 1 | 1 | 1 | 1 | 0 | 0 | 0 | 0 |
| 0 | 0 | 0 | | 0 | 1 | 1 | 1 | 1 | 0 | 0 | 0 |
| 0 | 0 | 0 | 0 | 1 | 1 | 1 | 1 | 0 | 0 | 0 | 0 |

FIG. 10

3,505,470

PROCESS AND DEVICE FOR CODING AND DECODING DIGITAL SIGNALS VIA PHASE MODULATION

Etienne P. Gorog, Scarsdale, N.Y., assignor to International Business Machines Corporation, Armonk, N.Y., a corporation of New York Filed Mar. 28, 1967, Ser. No. 626,591
Claims priority, application France, Apr. 1, 1966, 7,777
Int. Cl. H04l 27/18
U.S. Cl. 178—66 11 Claims

ABSTRACT OF THE DISCLOSURE

A multi-phase digital signal modulation device in which a multi-bit code defining a phase modulated wave is inserted into a shift-register/counter operating as a shift register. After entry is completed, the shift-register/counter, operating as a counter, is counted to a predetermined value by quick time pulses which are simultaneously applied to a second counter and cause it to recirculate during this time period. The second counter is completely recirculated at a slower rate and the contents serially applied to an output line while the next multi-bit code is inserted in the shift-register/counter acting as a shift register. This process is repeated for the successive multi-bit codes. A demodulator for the phase modulated wave includes a first register for receiving the modulated signal. A second register of the same length is circulated one bit position at a time until both registers are identical. A counter records the number of position shifts needed to make both registers equal. The contents of the counter are then shifted to a utilization device causing the counter to return to zero which prepares it for the next cycle operation.

The present invention relates to the transmission of bit type data and more generally to digital data in plural phase form.

Numerous processes and devices are known for transmitting digital data in four phase form, but said methods are difficult to apply and involve complex devices, should the number of phases transmitted be increased.

Accordingly, the present invention has for one of its objects to provide a method for transcoding digital data into multiphase signal.

Another object of the invention is to provide means for transcoding a digital signal into multiphase form and vice versa.

Another object of the invention is to provide a process for having an $n$ digital element set ($n$ being one or more) each taking ($a$) distinct values, transcoded into an $N=a^n$ phase signal or vice versa.

Another object of the invention is to provide a process for getting a signal taking N possible phases in one to one correspondance with each of those N possible combinations of the values of said $n$ digital elements.

Another object of the invention is to provide a process for getting an N phase signal consisting of a sequence of N bits.

Another object of the invention is to provide a process for getting each of those N phases via a given bit sequence and/or via one of the $N-1$ circular permutations obtained therefrom.

Other objects of the invention are those devices for implementing the above mentioned processes.

The above objects are basically accomplished in accordance with the invention via:

means for recording the digital elements to be transmitted.

means for elaborating an N possible phase sequence from a sequence of N binary elements.

means from getting out of said sequence the remaining $N-1$ sequences derived from the first one by circular permutation.

means for selecting one out of said $N-1$ sequences or the initial sequence itself, under action of signals controlled by the value of the elements to be transmitted so as to get a one to one correspondence between said N sequences and the N possible combinations of the element values to be transmitted ($N=a^n$)

means for receiving the phase modulated signals;

means for identifying said phase and derive the values of those initial $n$ corresponding elements.

these and other objects, features and advantages of the invention will become apparent from the following more particular description of a preferred embodiment thereof when read with the accompanying drawings in which:

FIGURE 1 discloses a block diagram of a modulation device constructed in accordance with the invention.

Figure 4:
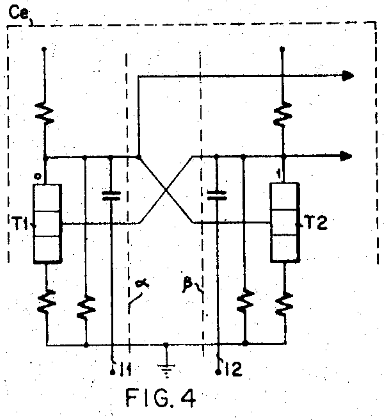

FIGURE 4 discloses a possible illustrative schematic of a basic bistable "cell" which may be used in the circuits illustrated in block form.

Figure 1:
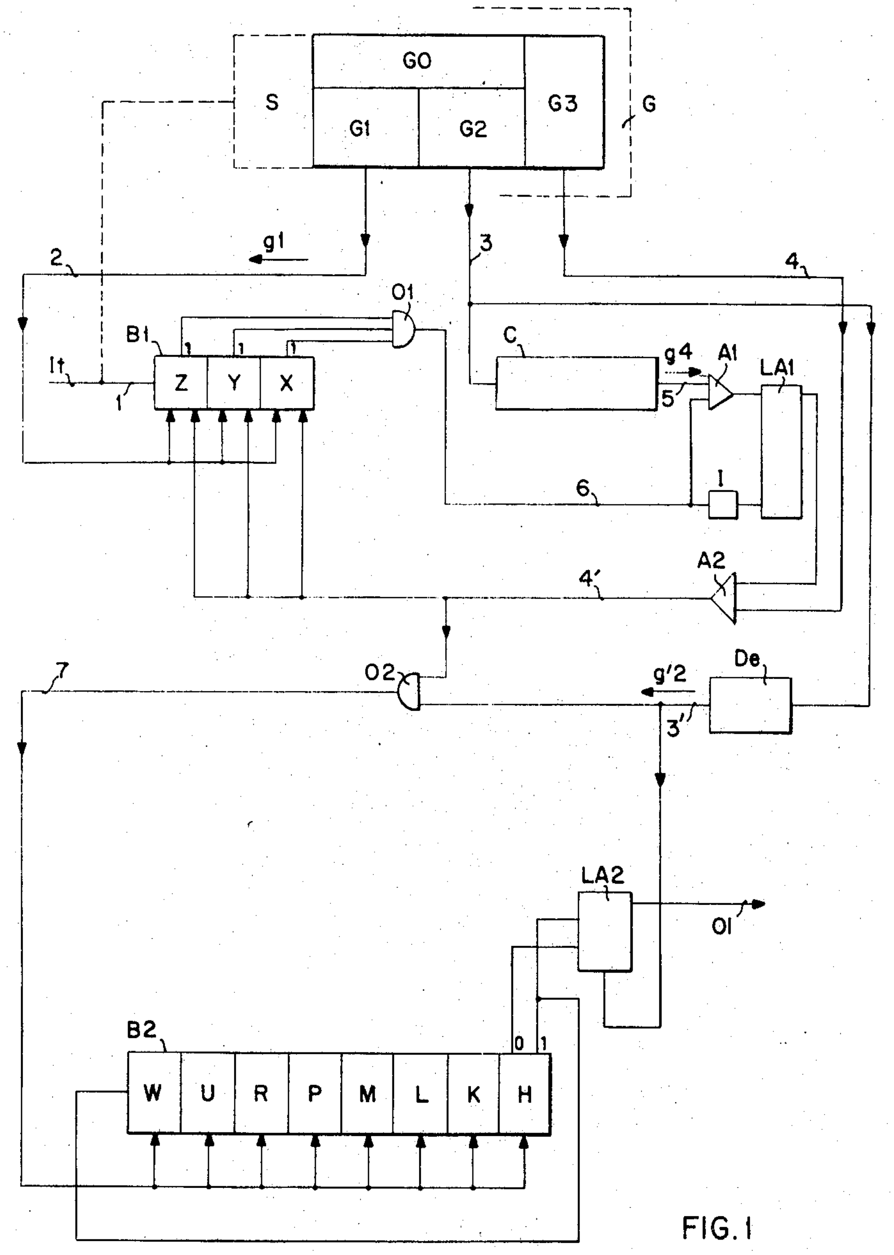
Figure 5:
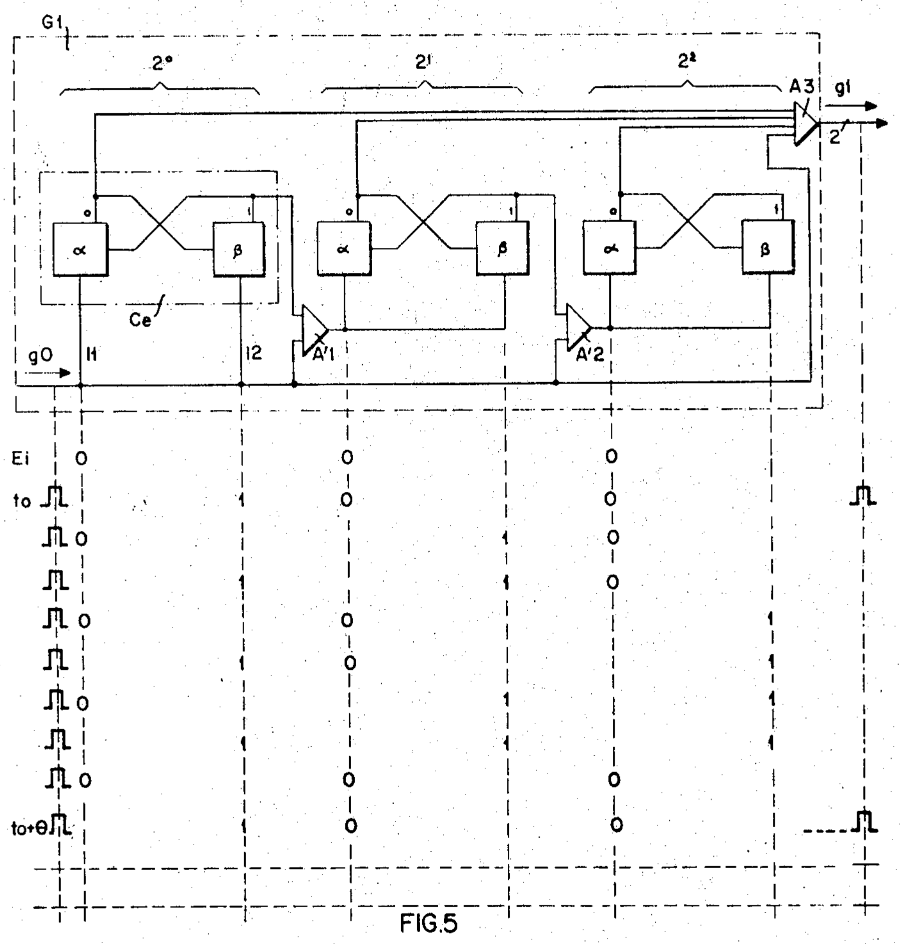

FIGURE 5 discloses a block diagram of a generator G1 of FIG. 1 and includes a chart of the status of the various stages of that generator.

Figure 6:
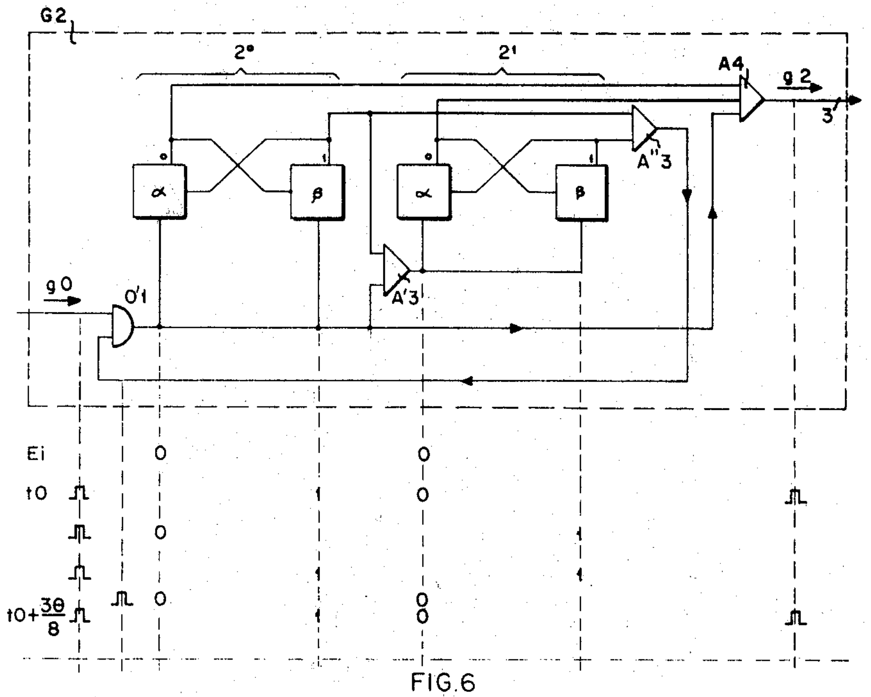

FIGURE 6 is a block diagram of a generator G2 of FIGURE 1 and includes a chart of the status of the various stages of that generator.

Figure 7:
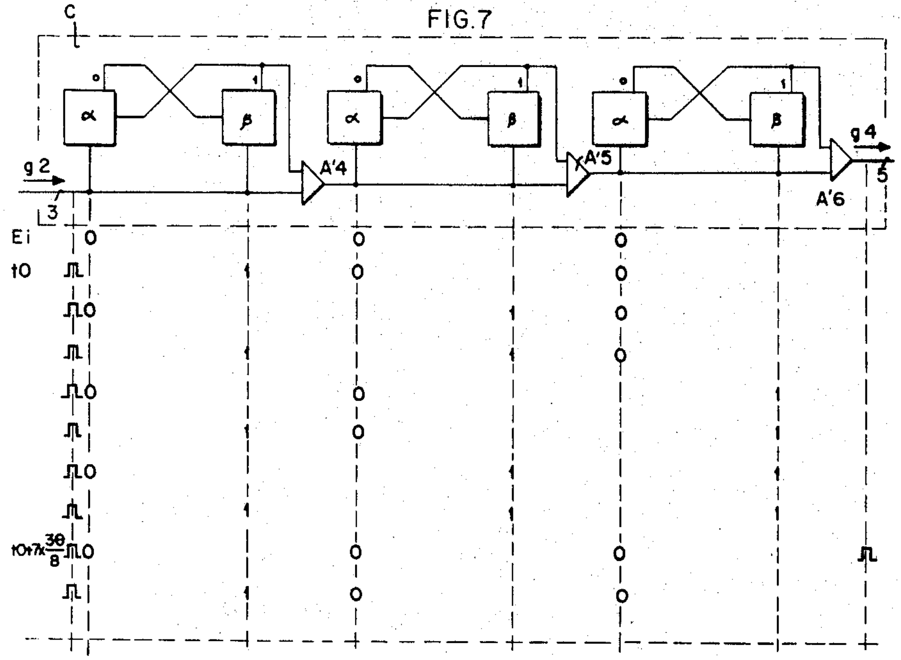

FIGURE 7 is a block diagram of pulse counter C of FIGURE 1.

Figure 8:
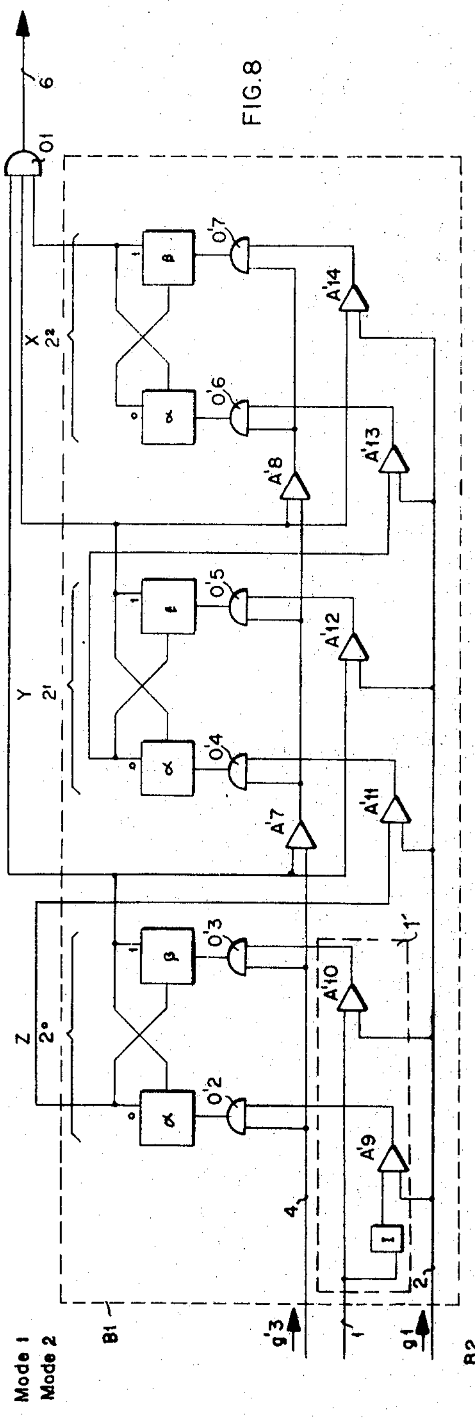

FIGURE 8 is a schematic block diagram of register B1 shown in FIGURE 1.

Figure 9:
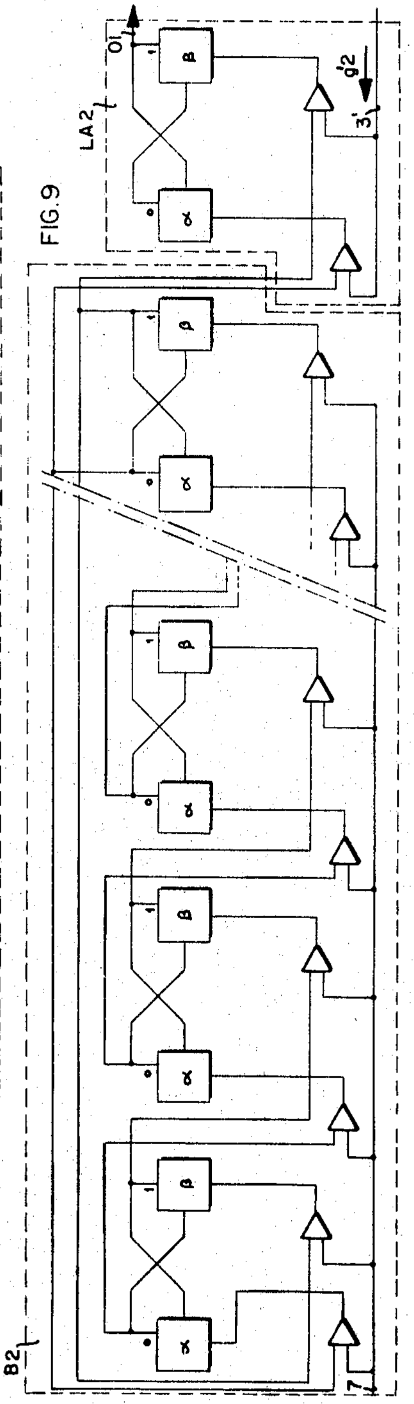

FIGURE 9 is a schematic block diagram of a register B2 shown in FIGURE 1.

FIGURE 10 is a chart disclosing for the herein illustrative example the following correspondence: values to be transmitted and phase of the signal sent.

Figure 11:
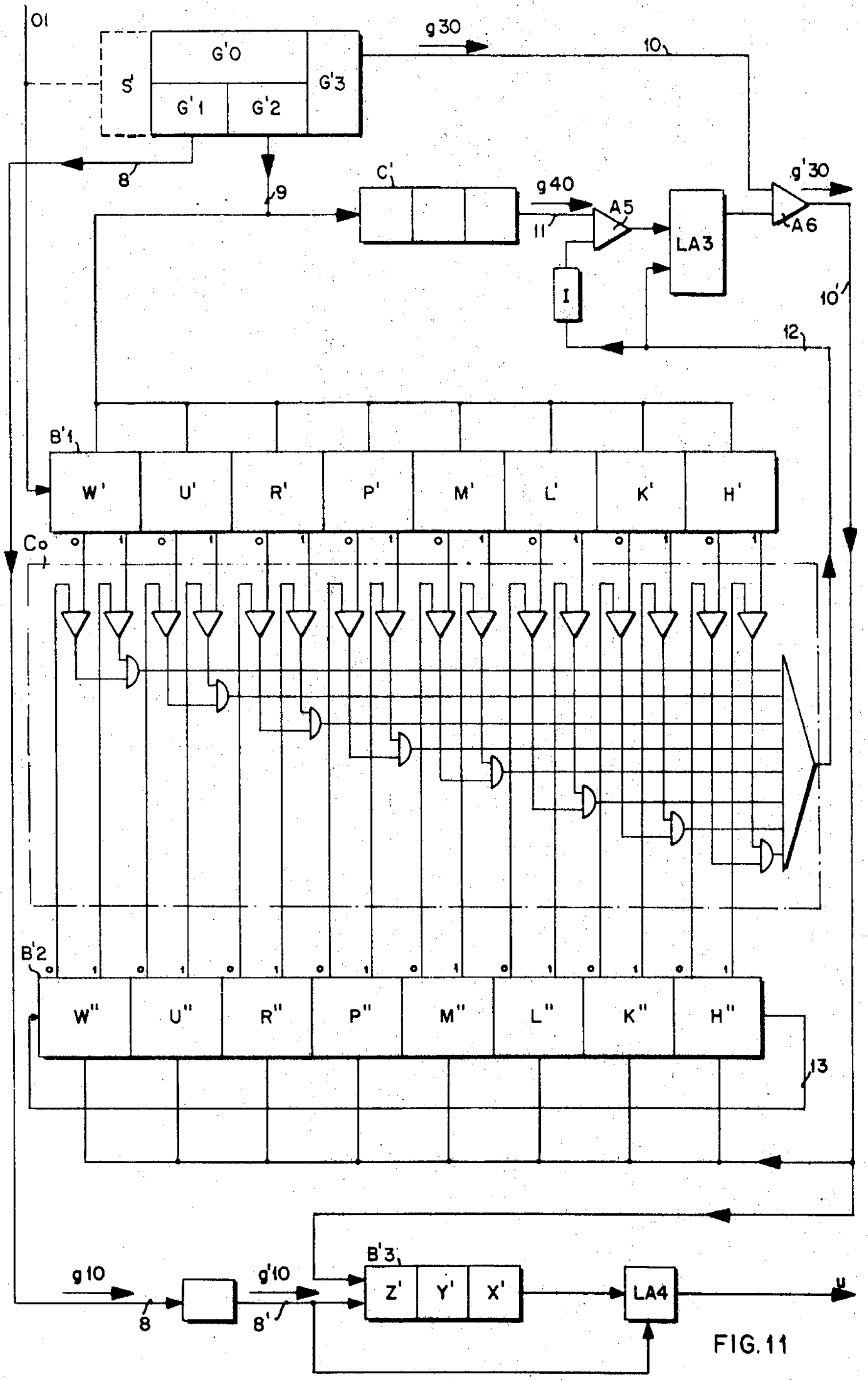

FIGURE 11 is a schematic diagram of a receiver suitable for receiving signals modulated by the modulator of FIGURE 1.

Figure 12:
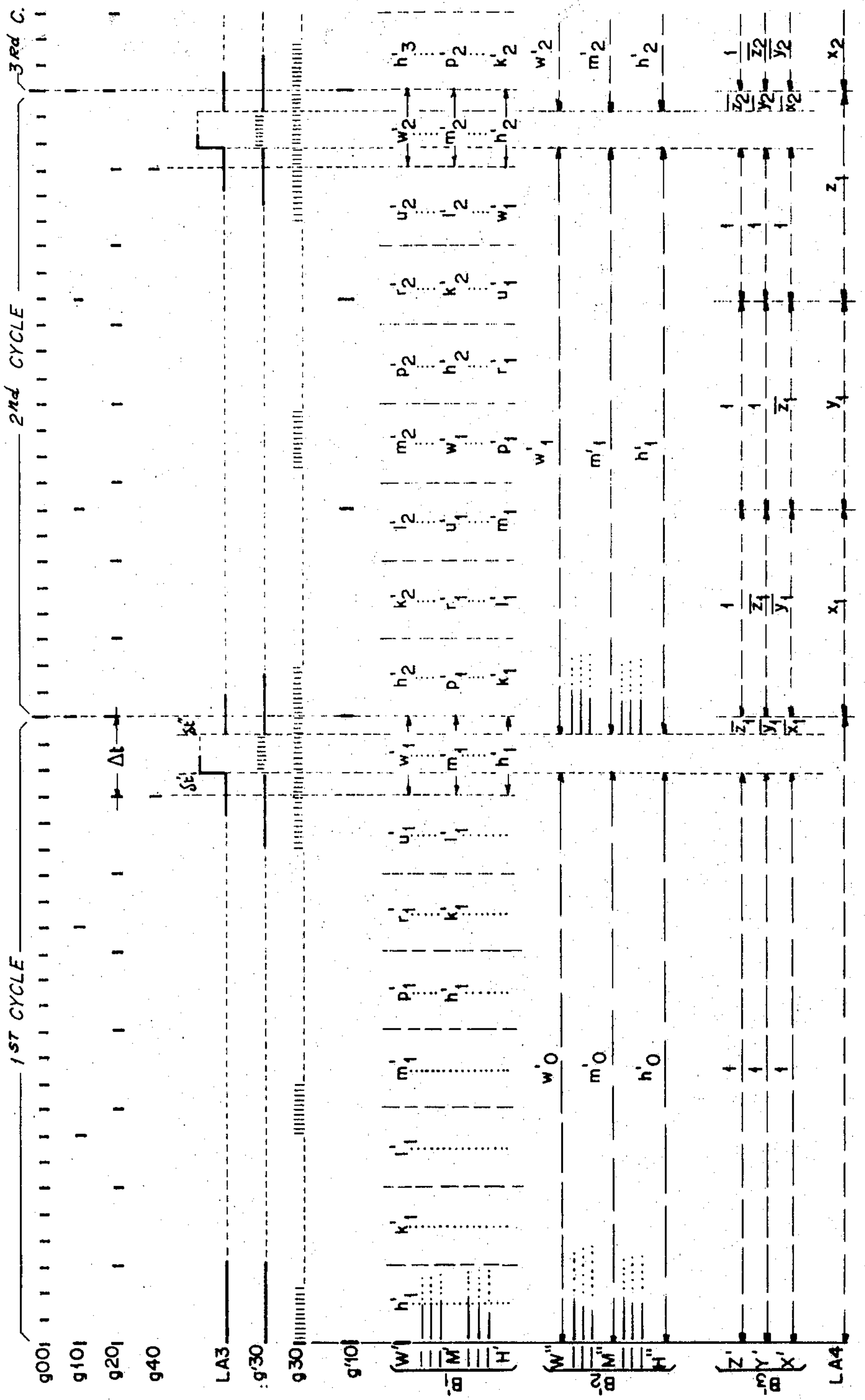

FIGURE 12 is a timing chart for the receiver of FIGURE 11.

Figure 13:
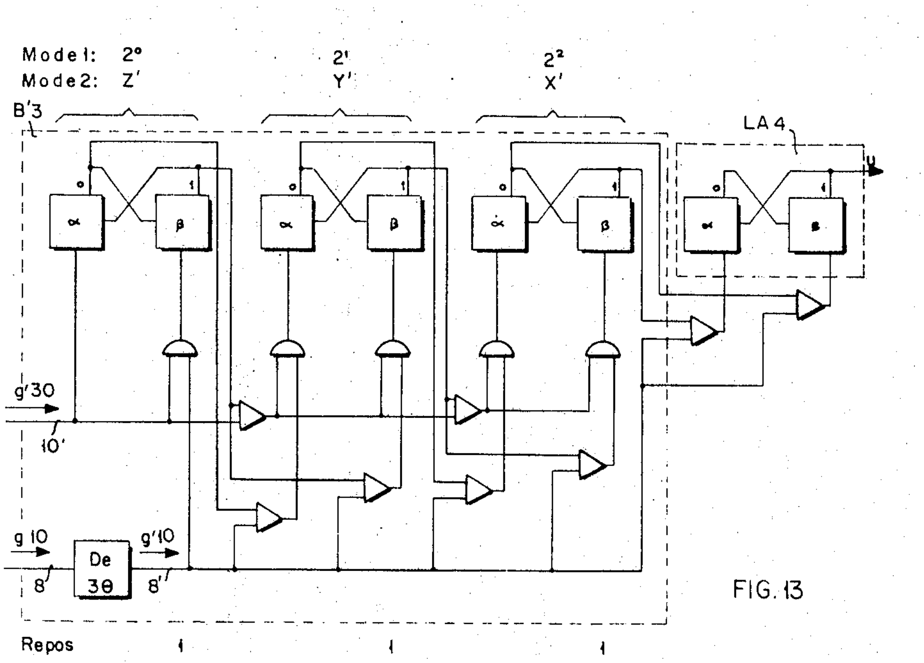

FIGURE 13 is a block diagram of register B'3 shown in FIGURE 11 and the circuits controlling the register.

Figure 14:
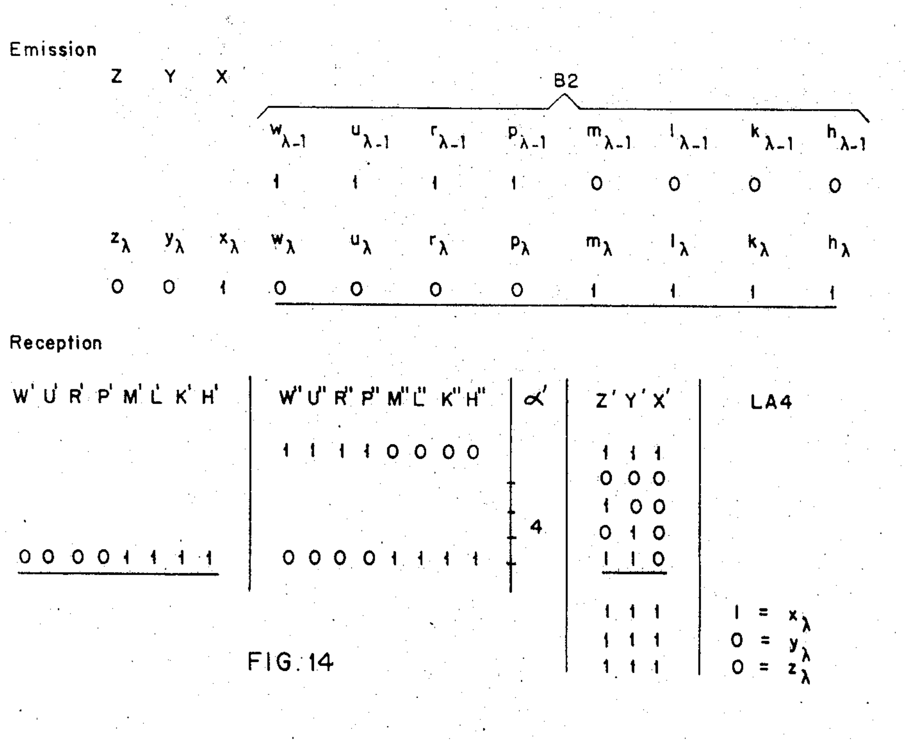

FIGURE 14 is a chart summarizing the operation of the receiver shown in FIGURE 11 for the particular transmission described in FIGURE 1.

The following description applies when the digital elements are bits or when among the possible values only two of them are data representative ($a=2$) and the attached figures have been established for the case $n=3$ this yielding $N=a^n=2^n=2^3=8$; it will be understood that those values are taken arbitrarily and are merely illustrative thereby enabling a more detailed description by fixing the starting conditions.

Referring to FIG. 1 there is shown general block diagram of the transmitting side emphasing the basic components, that is, a clock unit G, whose time basis is a function of the desired transmitting speed and of the chosen phase number; a register B1 fed by the data to be transmitted and operating on said data as will be seen in detail subsequently, and whose operation is the same no matter the value given to $n$, said counter comprising $n$ stages ($n=3$ in the herein illustrative example). The figure shows a binary counter C capable of taking N values ($N=2^3$ herein), an N stage recirculating register B2 and other circuits securing the operation of the unit to be more fully described in the illustrative case when $n=3$.

Data to be transmitted are fed through line 1; start, presence and end of messages on line 1 are detected by synchronization circuit S whose design depends on the way data arrive through 1. The design of the synchronizing circuit S will depend on the transmission system and is not a part of the invention and will not be further described herein. Data arriving on line 1 enters register B1 under control of pulses $g1$ delivered by G1. These pulses successively sample line 1 and shift the data into register B1 so as to have finally $n$ successive elements (herein 3: $xyz$) positioned in those $n$ stages (herein 3: XYZ) of B1. Although not necessarily in the herein illustrative example, those $n$ elements are ordinarily binary elements and will whatever they are initially be binary once inserted in register B1.

To each set of values $x_\lambda y_\lambda z_\lambda$ corresponds a definite phase shift of the signal to be sent on O1; said signal is constituted by a sequence of N bits (herein 8) obtained by causing register B2 to recirculate or shift $\alpha$ times from a starting or the previous combination. $\alpha$ is obtained or derived from the number of pulses required to restore register B1 to a predetermined reset value from the value $x_\lambda y_\lambda z_\lambda$. In the herein illustrative example, the reset value has been arbitrarily taken to be 000. As those $n$ elements (herein 3) $x_\lambda y_\lambda z_\lambda$ are being fed to B1, the N elements $h_{\lambda-1}$, $k_{\lambda-1}$, $l_{\lambda-1}$, $m_{\lambda-1}$, $P_{\lambda-1}$, $r_{\lambda-1}$, $u_{\lambda-1}$, $w_{\lambda-1}$, corresponding to elements $x_{\lambda-1} \ldots y_{\lambda-1} \ldots z_{\lambda-1}$, are being sent on O1. After the last term $w_{\lambda-1}$ has been sent, register B2 is shifted or rotated, $\alpha_\lambda$ times for obtaining $h_\lambda k_\lambda \ldots w_\lambda$; this transformation which is being done under control of high rate pulses $g3$ delivered by generator G3 must be completed before the arrival of term $x_{\lambda+1}$ since, as before, elements $h_\lambda k_\lambda \ldots w_\lambda$ are sent on O1 as $x_{\lambda+1} \ldots y_{\lambda+1} \ldots z_{\lambda+1}$, are being recorded into B1 and so on, without halting the $xyz$ element receipt sequence nor the $h, k \ldots w$ element transmit sequence. It should be noted that at the beginning of a message elements $x_1 \ldots y_1 \ldots z_1$ will be received on 1 without having to simultaneously send any thing on O1. But upon message end, after receipt of $x_f \ldots y_f \ldots z_f$ nothing more will be received on 1 but transmission on O1 will have to be completed by sending thereon $h_f k_f \ldots w_f$; this imposes a delay between everything dealing with the receipt of elements $x \ldots y \ldots z$ and the sending of the corresponding elements $h, k, \ldots w$, this delay being $n\theta$ ($n=3$ herein) where $\theta$ is the duration of a data element on 1.

The transmission system described above is differentially coherent, that is, any given $n$ bit code inserted in the input register B1 will cause the corresponding group of N bits shifted onto line O1 to be phase displaced the same amount from the next preceding group. Thus, if two identical successive $n$ bits codes are inserted into register B1, the two N bit codes corresponding thereto shifted onto line O1 will each be displaced from its next preceding code by a fixed amount determined by the number of $g3$ pulses required to restore input register B1 to the arbitrarily selected reset value.

Figure 2:
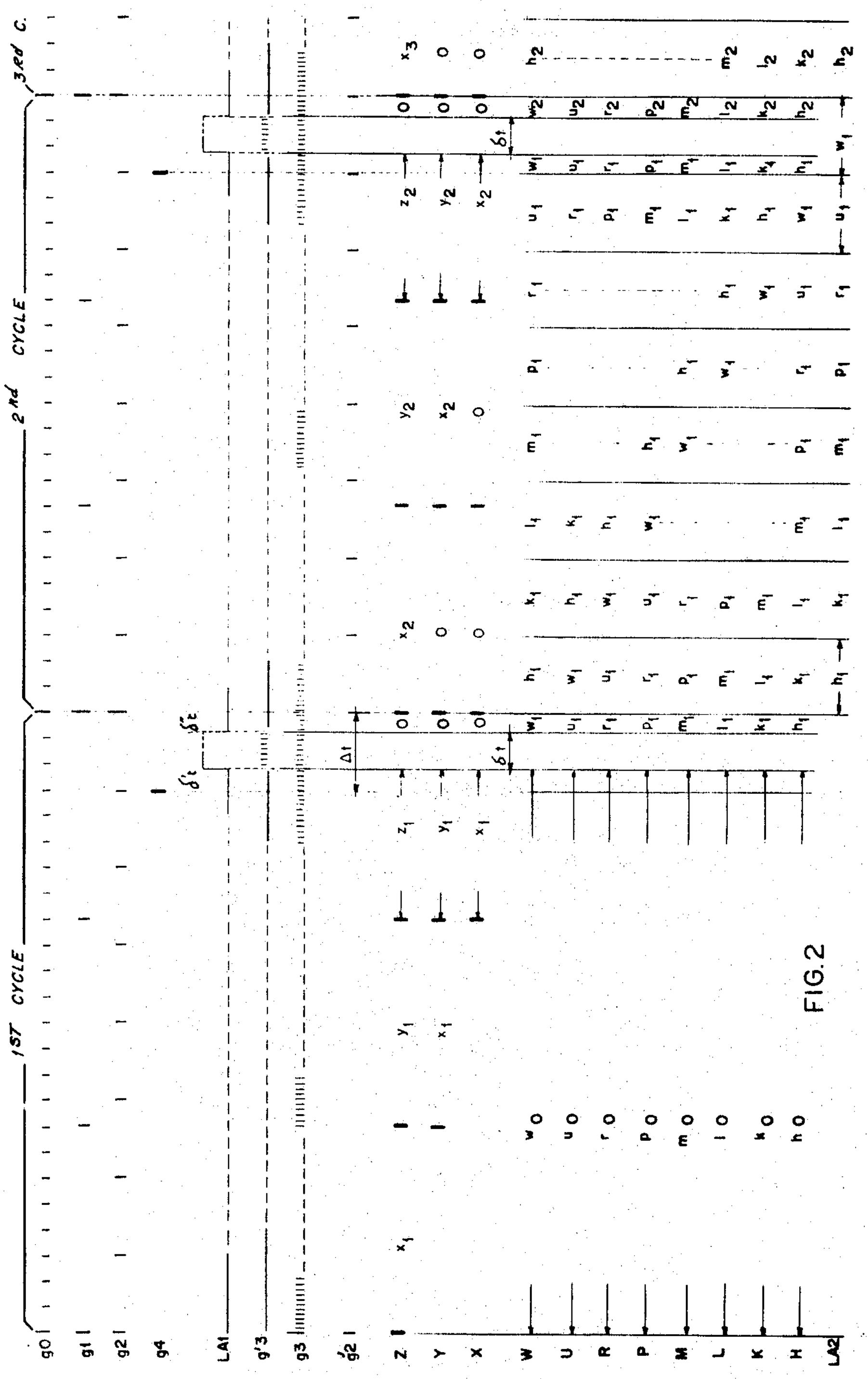
FIGURE 2 is a timing chart illustrating the operation of the embodiment shown in FIGURE 1.
Figure 3:
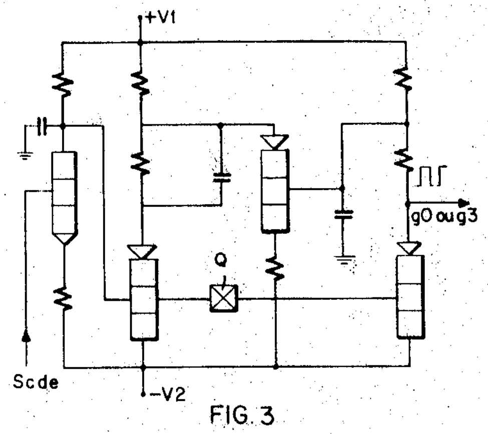
FIGURE 3 is a possible illustrative schematic of the generator G0 and/or G3 of FIGURE 1.

Since N bits are sent on O1 during a time equal to the amount of time taken from $n$ elements to be received on line 1, there will be a definite relation between pulses delivered by G1 and pulses delivered by G2, that is: during a time $n\theta$, G1 delivers $n$ pulses and G2 N pulses (herein $2^3=8$). A plurality of methods may be used to get this relation and among them, in the herein illustrative example, the one chosen although not exclusive, is that of extracting pulses $g1$ and $g2$ among the pulses $g0$ given by a clock G0 intitiated by S, as was seen, at the start of a message arriving on 1 and that delivers during a time $n\theta$ some number of pulses, equalling a common multiple (preferably the least one) to $n$ and N. As to generator G3 delivering pulses $g3$ that control recirculation through register B2, it must be fast, any way fast enough to deliver $N-1$ pulses in a time interval $\delta t$ slightly less than $n\theta/N$; $\delta t$ is taken as being less than $\Delta t=n\theta/N$ for device operation reliability, so as to be sure that all B2 content transformations are actually effected. G3 may be, except for frequency, of the same type as G0, initiated at the time G0 gets initiated, and deliver pulses continuously, the latter being operative only during time slots determined by proper circuits to be described subsequently. FIGURE 2 is a timing chart for the over all operation of the device of FIGURE 1, starting from a message start. Data arrive on 1 in the form of high or low level on line 1, and as for all transmission devices, S starts G0 at the proper time so as for G1 designed accordingly, to deliver sampling pulses $g$1 at a proper time close to $\theta$ midinstant at which time line 1 is either up or down in the herein example. Generators G0 as well as G3 may be, except for those prerequisites enumerated previously, of various types, although for description purposes a specific example has been given in FIGURE 3; the latter figure shows a quartz oscillator (Q) the operation of which is controlled by the switching ON of a transistor under control of S via line S*cde*, but which is of known type except for the control via circuit S.

As to the remaining generators, registers used, their designs are somewhat arbitrary so long as they accomplish those functions demanded by the subject system, and the following description is nothing more than illustrative, its purpose being that of aiding in the understanding of the invention; those just mentioned devices are made up of combinations of several bistable cells (C*e*). These may be designed according to the numerous methods known in the art. FIGURE 4 is an example of a known cell, either transistor being ON causes the other to go OFF and a pulse appplied through the input 11, 12 corresponding to the cut off transistor, or a pulse applied to both inputs at the same time will cause the cut off transistor to go ON and the ON transistor to thereby go OFF.

Following these just mentioned general considerations, the operation of the device will be now elaborated on, in reference with FIGURES 1 and 2. The first data element $x_1$ arrives through line 1; to the first pulse $g$0, corresponds the first pulse $g1$ that records into position Z of B1, value $x_1$; upon the second pulse $g1$ after a time $\theta$, $x_1$ is transferred into Y and $y_1$ arriving on the line gets into Z; upon the next $g1$ pulse, $x_1$ shifts into X, $y_1$ into Y and $z_1$ present on line 1, into Z this going on for $ng1$ pulses so as to fill the $n$ positions of B1 (herein $n=3$). During the above time $g2$ delivers also its first pulse concurrently with the first $g0$ pulse, then the next one after a time $n\theta$/N and so on; $g2$ pulses are counted by counter C and whenever G2 has delivered N of them (herein 8 since $N=2^3$), C delivers its first $g4$ pulse which via AND circuit A1 causes latch LA1 to set if one or more stages of register B1 is 1.

Via line 4, the $g3$ pulses delivered by G3 go through AND circuit A2 and make up pulses $g'3$ which via OR circuit O2 causes B2 in recirculate from initial values $h_0$, $k_0 \ldots w_0$ and in addition restores register B1 to its reset value (000 herein). As soon as this value is reached after $\alpha_1$ pulses $g$3, LA1 is reset, AND circuit A2 is inhibited blocking further $g3$ pulses; it should be noted that the time interval $\alpha$ is not drawn to scale in FIGURE 2; actually said time is very small, and is the time elapsing between delivery of $g4$ and setting of LA1. As to $\delta t$ it is variable, since while being always less $\Delta t$, $\delta t$ is a function of the number of $g'3$ pulse. In the herein illustrative example, it may be seen from the figure that $g4$ sets LA1 only if the three B1 values are not zero; in effect, AND circuit A1 is enabled via line 6 through OR circuit O1, if any of the values X, Y, Z is equal to 1. Similarly it may be seen that via line 6 and inverter I, LA1 is reset as soon as the three values in positions XYZ are zero. Recall why N pulses $g2$ (herein 8) were counted before shifting the contents of B2. The reason why is obvious should one consider an abitrary transmission cycle, say the second one. In this cycle, as B1 is filled up with $n$ new elements (herein $n=3$) yielding $x_2$, $y_2$, $z_2$, N elements $h$, $k_1 \ldots w_1$ are sent on OI and toward the end elements $h_1$, $k_1 \ldots w_1$ are sent on OI and toward the end of the operation B2 returns to $h_1$, $k_1 \ldots w_1$; it will only be from those values that B2 will be shifted $\alpha_2$ times in order to get $h_2$, $k_2 \ldots w_2$ corresponding to $x_2y_2z_2$. The $g'2$ pulses that shift B2 in order to send its contents on O1 are directly derived within a cycle shift (delay $\theta$) from the $g2$ pulses and, upon each cycle, sending on O1 is terminated after N $g'2$ pulses. That is why in each cycle, B2 recirculation are initiated by $g3$ pulses only after N $g2$ pulses (herein 8) have been counted. Pulses $g2$ then get, via line 3, to both counter C and delay device D$e$ that delays them one cycle, that is by $n\theta$ (herein $3\theta$); the $g'2$ pulses that come out get via line 7, and OR circuit: O2, to B2 and LA2 this in function of pulses $g2$ only, thereby isolating line O1 from modifications suffered by B2 whenever the latter receives pulses $g'$3.

After having disclosed the over-all operation of the device it should be interesting to consider the design of generators G1, G2, counter C, registers B1 and B2 even through said design is only one out of many possible implementations. Generator G1 lets the first $g0$ pulse get through said pulse being the first $g1$ pulse, then blocks the next $N-1$ $g0$ pulses, then lets through the next $g0$ pulse making up the second $g1$ pulse, blocks the next $N-1$ $g0$ pulses and so on. G1 is basically an $n$ stage counter, each of said stages being a bistable cell C$e$ (already described in FIGURE 4) consider the circuit of FIGURE 5 wherein $n=3$; at rest, each of position $2^0$, $2^1$, $2^2$, is at zero; in each of them, lines 0 are up, the first $g0$ pulse is then routed through AND A3 yielding the first $g1$ pulse; simultaneously via 12, said first pulse $g$0 causes position "$2^0$" to set on "1"; the next $g0$ pulse does not go through the AND circuit A3 which is disabled, but resets "$2^0$" on "O" and by A'1 sets bit position "$2^1$" on "1" this going on until the eighth $g0$ pulse (since here $n=3$ and $N=8$) that will not be routed through A3, but will reset positions $2^0$, $2^1$, $2^2$. The next $g0$ pulse then acts as the very first one, and yields the second $g1$ pulse, and so on. The chart disclosed in FIGURE 5 gives more details on operation by giving the signals at the input and across the output of G1 as well as bit position status during operation.

Generator G2 lets the first $g0$ pulse go through, this giving the first $g2$ pulse, then blocks the next $n-1$ pulses, then lets the $g0$ pulse following them go through, then again blocks the next $n-1$ pulses and so on. G2 is basically a binary counter that counts up to $n$ (here $n=3$). FIGURE 6 is a block diagram of G2 for $n=3$; at rest, positions $2^0$ and $2^1$ are at zero on each of the "0" lines are up, the first $g0$ pulse then goes through AND A4 and provides the first $g2$ pulse and simultaneously this first $g0$ pulse triggers bit position "$2^0$" on "1"; the next $g0$ pulse does not go through AND A4 which is disabled but resets "$2^0$" to "0" and via A'3 sets position "$2^1$" on "1"; similarly the following $g0$ pulse does not go through A4, keeps "$2^1$" on "1" since it does not go through A'3, and sets $2^0$ on "1" (the counter is counting 3). The next $g0$ pulse must act just like the very first one then G2 must be at rest: 0, 0 whenever said pulse shows up; G2 should then be reset ($2^0$ and $2^1$ on "0") as soon as it records 3 ($2^0$ and $2^1$ on "1"); this is effected by AND A''3 and OR O'1; in effect, as G2 records "3" the output "1" of "$2^1$" is already up, the output "1" of "$2^0$" goes up and this status change is transmitted by A''3 and via OR circuit O'1 acts on G2 (as would a $g0$ pulse) that it resets. The incoming $g0$ pulse then finds G2 at rest, crosses A4 and makes up the second $g2$ pulse, again G2 blocks the next two $g0$ pulses, and so on. FIGURE 6 also includes a chart giving the signals on the input, output and feed back lines as well as position status during operation.

Counter C has to count N pulses $g$2 (herein 8) and deliver a $g4$ pulse upon receiving the Nth $g2$ pulse. FIGURE 7 shows counter C as applying in the illustrative example where $N=8$. At rest the counter is at zero; the first $g2$ pulse sets position "$2^0$" on "1", the second one via AND A'4 sets "$2^1$" on "1" and resets "$2^0$" on "0," the seventh $g2$ pulse sets all of the positions on "1," the eighth $g2$ pulse goes through circuits A'4, A'5 and A'6 and provides the first $g4$ pulse on line 5 and simultaneously resets C to zero; the counter will work for the subsequent $g2$ pulses as for the first N ones, and so on. In FIGURE 7 more details are given on the operation by a chart that sets forth the signals on the input and output lines and the "positions" status during operation.

The register B1 should be able to act as a shift register (mode 1) in order to record a sequence of $n$ elements under action of pulses g1, it also has to act as a counter (mode 2) whenever the $g'3$ pulses are present so that it may be returned to the rest or reset values (000 herein), incoming elements through 1, being binary elements in the herein illustrative example.

Register B1 is shown in FIGURE 8 where line 1 up or down levels are applied to AND circuit A'10 and via an inverter $i$ to AND circuit A'9. Sampling pulses $g1$ arriving through line 2 are applied to AND circuits A'9 and A'10, this allowing to record into position Z the data present on line 1 by triggering Z on "1" or "0" according to the level of line 1; it should be noticed that circuits 1' may actually be modified in accordance with the transmit mode on 1 (which may have for example three levels; one reset level, and two data levels). As they excite circuits 1', pulses $g1$ concurrently excite AND circuits A'11, A'12, A'13, A'14 thereby shifting into Y the contents of Z, and into X the contents of Y; therefore after three pulses $g1$ (since $n=3$ herein), three successive data $x_\lambda$, $y_\lambda$, $z_\lambda$ on 1 are then recorded into positions X, Y, Z of B1. Before the next pulse $g1$ arrives for inestring $x_{\lambda+1}$ into Z, the contents $x_\lambda y_\lambda z_\lambda$ of B1 are reset to zero (herein) by pulses $g'3$ arriving via 4'. AND circuits A'7, A'8 act as circuits A'4, A'5 of counter C (FIGURE 7), OR circuits O'2, O'3, O'4, O'5, O'6, O'7 are merely there for exciting the various stages, either when B1 acts as a shift register, or when it acts as a counter.

One possible configuration of register B2 and transmitter LA2 are shown in FIGURE 9. During action of the high rate $g'3$ pulses arriving on line 7, register B2 is recirculated and transmitter LA2 is disabled since it does not receive $g'3$ pulses thus line O1 is isolated. But at the time of the sending of the signal on the line under control of pulses $g'2$ incoming through line 7, register B2 recirculates as previously, but at the pace of the $g'2$ pulses and elements $h_\lambda k_\lambda m_\lambda p_\lambda r_\lambda u_\lambda w_\lambda$ are concurrently sent to LA2 which transmits the successive corresponding status on line O1. When the N element (herein 8) have been sent to LA2, register B2 is restored to the starting condition which will be modified for transmitting the N bit code corresponding to elements $x_{\lambda+1}$ $y_{\lambda+1}$ $z_{\lambda+1}$. At the end of a message, a command from S will reset LA2 to zero or place on O1 a reset level, or any other condition according to the transmission type on C1. It should be noted that data $xyz$ are received during one cycle and that corresponding data $hkl \ldots w$ are sent during the subsequent cycle; that is why pulses $g'2$ that excite LA2 and B2 are directly derived from pulses $g2$ by a delay device D$e$ delaying by one cycle, a cycle duration being $n\theta$; the delay device D$e$ may be designed in many ways conventional in the art. In order to complete the description of the transmitter, FIGURE 10 is a chart of the weight possible values ($x$, $y$, and $z$) which may be inserted in register B1 and the number ($\alpha$) of pulses $g'3$ required for resetting register B1 to zero. In each instance, it was assumed the register B2 started from the same sequence $Ei$. In practice, this is not apt to occur since the transmission system is diffierentially coherent and was so illustrated to facilitate the description. In each instance the code inserted in register B1 is underlined and the code transmitted an output line O1 is underlined.

The description which follows relates to the reception of data sent on O1; the N element (herein 8) sequence $h_\lambda k_\lambda \ldots w_\lambda$ is being received; on the other hand, in the receiving device is a sequence of N elements (herein 8: $h'_{\lambda-1}k'_{\lambda-1} \ldots w'_{\lambda-1}$) in one to one correspondence with $h_{\lambda-1}k_{\lambda-1} \ldots w_{\lambda-1}$ undergoing change at the transmitting side in order to obtain the subsequent sequence $h_\lambda k_\lambda \ldots w_\lambda$. Sequence $h'_{\lambda-1}k'_{\lambda-1} \ldots w'_{\lambda-1}$ in the receiver is then modified in order to obtain $h_\lambda k_\lambda \ldots w_\lambda$; corresponding to $h'_\lambda k'_\lambda \ldots w'_\lambda$; this correspondence between $h'_\lambda k'_\lambda \ldots w'_\lambda$ and $h_\lambda k_\lambda w_\lambda$ is given by a constant one to one relation taken to exist a priori between the two sequences. Preferentially $h'_{\lambda-1}k'_{\lambda-1} \ldots w'_{\lambda-1}$ will be taken as being identical to $h_{\lambda-1}k_{\lambda-1} \ldots w_{\lambda-1}$ this necessarily yielding at the origin, as will be seen subsequently, $h'_0k'_0 \ldots w'_0=h_0k_0 \ldots w_0$. The number $\alpha$ of necessary shifts is counted in register B'3 and the values $x'_\lambda y'_\lambda z'_\lambda$ found then in B'3 in positions $X'_\lambda Y'_\lambda Z'_\lambda$ stand respectively for element $x_\lambda y_\lambda z_\lambda$, this on a one to one basis. FIGURE 11 is a block diagram of the receiver and includes a clock unit G', an N position register B'1 fed by the transcoded data from line O1, an N position recirculation register B'2 whose contents are made to coincide with that of B'1 via $\alpha$ shifts under action of $\alpha$ pulses counted into the $n$ position register B'3 which then contains $x_\lambda y_\lambda z_\lambda$ or their opposite, circuits $Co$ detecting the predetermined relation between the contents of B'1 contents and B'2, said relation being the equality in the example. The figure shows in addition a binary counter C' that may take N values and other circuits securing device operation.

Data to be received arrives via line O1; start, presence and end of a message on said line are detected by a circuit S' similar to circuit S of FIGURE 1. Data is gated into register B'1 under the action of pulses $g20$ delivered by generator G'2; said pulses $g20$ are so termed since they have to be identical to the pulses $g2$ delivered at transmitting side by generator G2. Pulses $g2$ provide the data transmission speed on O1 which is also the receiving speed. Pulses $g20$ of G'2 sample the successive status of O1 and shift the data into register B'1 so as to finally have those successive N elements (herein 8) in the N stages (herein 8): H', K', . . . W' of B'1. Each sequence $h_\lambda k_\lambda \ldots w_\lambda$ corresponds to a group of $n$ values (herein 3) $x_\lambda y_\lambda z_\lambda$ transcoded by the transmitter; those $n$ values will have to be reformed in order to be sent toward the output U. To obtain them, as soon as $h_\lambda k_\lambda \ldots w_\lambda$ are recorded into B'1 register B'2 is made to recirculate rapidly via $\alpha'_\lambda$ shifts, until its contents match (herein) that of B'1; the number of $\alpha'$ shifts necessary to accomplish this correspond on a one to one basis to the group of $n$ values (herein 3) $x_\lambda y_\lambda z_\lambda$ to be retrieved. Since one starts from the same sequence in B'2 as in B2 preferentially, $\alpha'_\lambda=\alpha_\lambda$; those $\alpha'_\lambda$ shifts are counted, by counting the $\alpha'_\lambda$ pulses that initiate them in register B'3. Shifting is started as soon as $w_\lambda$ is received and must be completed before the arrival of element $h_{\lambda+1}$, and takes place during a time interval less then the time separating $w_\lambda$ from $h_{\lambda+1}$, that is $n\theta/N$ (herein $3\theta/8$). Generator G'3 will be the same as generator G3. At the transmitter, the $\alpha$ shifts of B2 were determined by bringing back the contents $x_\lambda y_\lambda z_\lambda$ of B1 to a reset value; similarly register B'3 will be made to count under the action of pulses $g30$ furnished by G'3 which also trigger B'2 shifts. As was just seen, the preferential solution is $\alpha'_\lambda=\alpha_\lambda$; in these conditions, an $n$ position B'3 register will be required and will be similar to register B1 at the transmitter, and if the reset value of B'3 is taken to be the opposites to those elements making up the B1 reset value, when B'3 is made to evolve under action of those $\alpha'_\lambda=\alpha_\lambda$ pulses $g30$, it will always contain at the end of operation the inverted values $\bar{x}_\lambda\bar{y}_\lambda\bar{z}_\lambda$ of those elements transcoded at the transmitting side; after that B'3 has acted very quickly as a counter under action of pulses $g30$, $n$ shifts of B'3 (herein 3) in conjunction with LA4 which acts as an inverter will enable sending elements $x_\lambda$, $y_\lambda$, $z_\lambda$ over the output U. This is accomplished without stopping the receiving sequences on O1. It should be noted that at the beginning of a message reception, elements $h_1k_1 \ldots w_1$ will be received on O1 without having to send anything on U, but at the end of reception nothing more will be received on O1 however elements of $x_f y_f z_f$ must be sent and this requires a delay between recept of elements $h$, $k$, . . . $w$ and the sending of the retrieved elements $w$, $y$, $z$, this delay in $n\theta$ (herein $n=3$) where $\theta$ is the duration of a data element $x$ or $y$ or $z$. The first data element arrives on O1 and in accordance with a process similar to S, S' will initiate generator unit G'; to the first $g0$ pulse correspond the first $g20$ pulse that records in position W' of B'1, value $h'_1$; upon the second pulse after a time $n\theta/N$, $h'_1$ is transferred into U' and $k'_1$ arriving on O1 is recorded in W' and so on during N $g20$ pulses in order to fill the N positions of register B'1 (herein $N=8$); said $g20$ pulses are counted in counter C' (identical in all respects to counter C) and when G'2 has delivered N pulses (herein 8), the complete sequence has been registered into B'1 and at this time C' delivers a pulse $g40$ that via AND circuit A5 sets latch LA3 via line 10, pulses $g30$ delivered by G'3 are conveyed through AND circuit A6 and make up pulses $g'30$ which by 10' cause B'2 to recirculate from initial values $h_0$, $k_0$, . . . $w_0$ and in addition cause register B'3 to operate as a counter from its reset value (herein 111). As soon as the contents of B'2 equal B'1 $Co$ puts line 12 up resetting LA3 (or keeps LA3 fom getting set by blocking A5 should comparison be occurring from the very beginning), thereby closing A6 and blocking pulses $g30$. At this time the contents of B'3 are such that its positions X'Y'Z' hold values $\bar{x}_1\bar{y}_1\bar{z}_1$. Said contents are then applied to LA4 by pulses $g'10$ directly derived from pulses $g10$ with one cycle delay ($n\theta$); it is then transmitted to U by LA4 providing on U the status corresponding to the successive values $x_1y_1z_1$. During time $n\theta$, within which said values are sent to U, the $2^N$ values $h_2$, $k_2$, . . . $w_2$ are received and values $\bar{x}_2\bar{y}_2\bar{z}_2$ corresponding to them are put into B'2 said latter values being inverted before being sent to U on the next cycle and so on.

As to constitution of the various circuits of FIGURE 11, it has already been said that G' is identical to G and that counter C' is similarly identical to C; circuits B'1, B'2 and B'3 are as B1 and B2 constituted from bistable cells $Ce$ shown on FIGURE 4. Register B'2 is identical to register B2 and will thereby not be detailed further. The same thing applies for B'1 which is identical B'2 the recirculation loop 13 being solely taken off. B'3 has to act as both a register and a counter as does B1 FIGURE 1. Despite this similarity, FIGURE 13 gives more details on the construction of B'3 and of LA. The additional indications disclosed by FIGURE 13 gives the role of each stage according to whether B'3 acts as a counter: mode 1 or as a shift register: mode 2; it also gives the reset value used: herein 1, 1, 1. High rate pulses $g'30$ arriving via 10' cause B'3 to operate as a counter starting from the contents 1,1,1,; upon the end of pulse train $g'30$. B'3 holds in position X', Y', Z' values $\bar{x}_\lambda\bar{y}_\lambda\bar{z}_\lambda$ ($\lambda=1$ to $f$ from the beginning to the end of a message) corresponding to $x_\lambda y_\lambda z_\lambda$. The first $g'10$ pulse that then arrives causes the contents of X' to be transferred, after inversion into LA4, this sending $x_\lambda$ on U. It simultaneously causes Y' content transfer onto X', that of Z' into Y' and write 1 into Z'. It is the same for the remaining two pulses $g'10$ after which $x_\lambda y_\lambda z_\lambda$ will have been sent to U and after which the contents of B'3 will have been reset to 1, 1, 1.

Finally, FIGURE 14 gives a chart which is a summary of the correspondence between transmission/reception by giving: at transmitting a sequence $x_\lambda y_\lambda z_\lambda$ to send and the sequence $h_\lambda k_\lambda \ldots w_\lambda$ obtained from a given sequence $h_{\lambda-1}k_{\lambda-1} \ldots w_{\lambda-1}$, at reception the contents of B'1 B'2, B'3, some phases of the evolutions of said registers and of LA4 and the number $\alpha_\lambda=\alpha'_\lambda$ of pulses $g'30$.

It should be noted that the transmission mode in accordance with the invention facilitates, by its very nature error detection; in effect, the $\alpha n=N$ possible values of the starting elements are represented by N well defined combinations of N bits, any other combination of these N bits (there are 2N possible combinations) being nonsignificant and amounting to an error.

On the other hand, should such combination be occuring, comparison between contents of registers B'1 and B'2 would not occur even after N shifts, this in itself allowing to detect the presence of an error. Additional error detecting devices may be used taking into account those interesting properties.

It will be understood by those skilled in the art that the foregoing and other changes in form and details may be made without departing from the spirit and scope of the invention.

What is claimed is:

1. A digital code to phase modulation generator for converting multi-bit digitally coded data sets to corresponding phase modulated waves comprising:

first means for receiving and storing a data set;

register means having N positions equalling the maximum possible combinations of a multi-bit data set;

second means for concurrently altering the stored data set in the first means to a predetermined state and recirculating the register means; and third means operative after the first means attain the said predetermined state for circulating the register means through one complete cycle whereby data stored in the register means is serially available at any register position to thus provide a phase modulated wave corresponding to the data set previously stored in the first means.

2. A phase modulation to digital code receiver for converting phase modulated waves to corresponding multi-bit digitally coded data sets comprising:

first register means for receiving and storing the phase modulated waves, said register means having N positions for storing N states of the phase modulated wave, said N states equalling the maximum possible combinations of a multi-bit data set;

second register means having N positions in a predetermined state;

first counter means;

first control means for simultaneously recirculating the second register means one position at a time and operating said first counter means to accumulate the number of positions circulated;

comparator means responsive to the first and second register means for detecting simultaneous equality and thereupon rendering said first control means ineffective; and second control means operative after equality is achieved for supplying the contents of the first counter means to a utilization device.

3. A data transmission system including a transmitter for receiving multi-bit digitally coded data sets and converting the data sets to predetermined phase modulated waves, a receiver for converting phase modulated waves to corresponding multi-bit digitally coded data sets and a transmission medium providing a transmission path between the transmitter and receiver;

said transmitter comprising:

first means for receiving and storing a data set;

first register means having N positions equalling the maximum possible combinations of a multi-bit data set;

second means for concurrently altering the stored data set in the first means to a predetermined state and recirculating the first register means; and third means operative after the first means attain a predetermined state for circulating the first register means through one complete cycle whereby data stored in the first register means is serially available at one first register position to thus provide a phase modulated wave corresponding to the data set previously stored in the first means;

means for connecting said one first register position to the transmission medium;

said receiver comprising:

second register means for receiving and storing the phase modulated waves propagated over the transmission medium, said second register means having N positions for storing N states of the phase modulated wave, said N states equalling the maximum possible combinations of the multi-bit data set;

third register means having N positions in a predetermined state;

counter means;

first control means for simultaneously recirculating the third register means one position at a time and operating said counter means to accumulate the number of positions circulated;

comparator means responsive to the second and third register means for detecting simultaneously equality and thereupon rendering said first control means ineffective; and second control means operative after equality is achieved for supplying the contents of the counter means to a utilization device.

4. A digital code to phase modulation generator comprising:

first means operable as either a shift register or a counter;

second means providing a first pulse train for shifting an $n$ bit digital code defining a predetermined signal phase into the first means;

third means providing a second pulse train having N pulses per cycle and occurring in the time required to shift in the $n$ bits and in which $N=a^n$ where $a$ is the radix of the said digital code and $n$ is the total number of orders in the code;

fourth means providing a third pulse train having at least N pulses during a portion of the time period of one of said second train pulses;

an N stage recirculating register having an output at one predetermined stage;

fifth means responsive to the second pulse train for simultaneously applying the third pulse train to the first means and the recirculating register during the Nth pulse of each cycle to operate the first means as a counter until it reaches a predetermined value and circulate the recirculating register; and sixth means responsive to said second pulse train for circulating the recirculating register to provide a differentially coherent phase modulated signal at the said output of said recirculating register corresponding to an $n$ bit digital code shifted into the said first means in the next previous cycle of said second pulse train.

5. A generator as set forth in claim 4 in which said fifth means comprises:

a counter responsive to the second pulse train, circuit means responsive to a count of N in said counter, gate means responsive to said circuit means for passing the third pulse train when the count of N is detected, and circuit means responsive to a predetermined value of the said first means for disabling the said gate means when the first means reaches the said predetermined value.

6. A generator as set forth in claim 4 in which the radix ($a$) of the code is 2, the number of orders is 3 and the second pulse train has 8 pulses per cycle to thus provide an eight phase modulated signal.

7. A phase modulated signal to digital code receiver comprising:

a shift register;

first means for providing a first pulse train having N pulses per cycle for shifting a phase modulated signal into the said shift register;

a recirculating register having an equal number of positions as said shift register;

second means operable as either a counter or a shift register;

third means providing a second pulse train having at least N pulses during a portion of the time period of one of said first train pulses;

a comparator responsive to the said shift register and the recirculating register for indicating equality of both registers;

fourth means responsive to the first pulse train for applying the second pulse train to the recirculating register and to operate the second means as a counter during the Nth pulse of each cycle of said first means, and responsive to the comparator output for interrupting the application at said equality; and fifth means providing a third pulse train having *n* pulses per cycle of said first pulse train where *n* is the total number of orders in the code of radix (*a*) to be derived from the pulse modulated signal and bears the following relationship to N ($N=a^n$), for operating said second means as a shift register to provide an *n* bit digitally coded serial signal coresponding to the phase modulated signal received during the previous cycle of said first pulse train.

8. A receiver as set forth in claim 7 in which the radix (*a*) of the digital output code is 2, the number of orders is 3 and the first pulse train has 8 pulses per cycle to permit reception of an eight phase modulated signal.

9. A receiver as set forth in claim 7 in which said fourth means comprises:

a pulse counter responsive to the first pulse train, circuit means responsive to a count of N in said pulse counter, and gate means responsive to said circuit means for passing the second pulse train when the count of N is detected and responsive to said comparator means for interrupting passage at equality.

10. A method of transmitting data sets, each set composed of "*n*" bits each bit capable of assuming "*a*" values, comprising the step of:

entering a first specific data set into a first register;

providing a specific starting sequence of N transmission bits, where N equals the $a^n$ possible combinations of the data sets, in a second register;

resetting the first register a step at a time while simultaneously shifting the transmission bits a step at a time from their starting sequence so as to obtain a specific sequence of transmission bits; and transmitting the specific sequence of transmission bits during the time a second data set is being entered in the first register.

11. An apparatus for transmitting data sets, each set composed of "*n*" bits, each bit capable of assuming "*a*" values, comprising:

means for entering a first data set into a first register;

a second register having N bit positions said N positions corresponding in number to the $a^n$ possible combinations of the data set, the second register loaded with a specific combination of transmission bits;

means for resetting the first register a step at a time and simultaneously shifting the combination of transmission bits a step at a time until the first register is reset and a specific sequence of transmission bits remains in the second register representative of the first data set; and means for transmitting the specific sequence from the second register at the same time as a second data set is being entered into the first register.

References Cited

UNITED STATES PATENTS

| | | | |
|---|---|---|---|
| 3,319,054 | 5/1967 | Kelling | 235—92 X |
| 3,392,238 | 7/1968 | Lender | 178—67 |
| 3,421,088 | 1/1969 | Salley et al. | 178—66 X |

ROBERT L. GRIFFIN, Primary Examiner

B. V. SAFOUREK, Assistant Examiner

U.S. Cl. X.R.

325—30, 38; 235—155